(12) United States Patent
Greeson

(10) Patent No.: US 6,651,589 B2
(45) Date of Patent: Nov. 25, 2003

(54) APPARATUS FOR VARIABLY DISCHARGING INGREDIENTS ON AN ANIMAL

(76) Inventor: John S. Greeson, 320 E. Cheyenne Rd., Dexter, NM (US) 88230

( * ) Notice: Subject to any disclaimer, the term of this patent is extended or adjusted under 35 U.S.C. 154(b) by 0 days.

(21) Appl. No.: 09/810,904

(22) Filed: Mar. 15, 2001

(65) Prior Publication Data

US 2001/0010208 A1 Aug. 2, 2001

(51) Int. Cl.[7] ............................................. A01K 13/00
(52) U.S. Cl. ...................... 119/665; 119/656; 119/658; 119/667
(58) Field of Search ................ 119/665, 656, 119/658, 666, 667, 668, 669

(56) References Cited

U.S. PATENT DOCUMENTS

| 4,719,932 | A | * | 1/1988 | Burton ........................ 134/123 |
| 4,726,388 | A | * | 2/1988 | Swinehart et al. .......... 134/123 |
| 4,933,016 | A | * | 6/1990 | Carlson ........................ 134/18 |
| 4,946,513 | A | * | 8/1990 | Del Prato et al. ............ 134/113 |
| 5,630,379 | A | * | 5/1997 | Gerk et al. .................. 119/667 |
| 5,709,039 | A | * | 1/1998 | Jones ........................ 134/57 R |
| 5,758,603 | A | * | 6/1998 | Vivier ........................ 119/669 |
| 5,785,004 | A | * | 7/1998 | Hobbs ........................ 119/651 |
| 5,886,648 | A | * | 3/1999 | McElroy et al. ............ 134/123 |
| 5,988,113 | A | * | 11/1999 | Zhioua et al. ............... 119/657 |
| 6,029,610 | A | * | 2/2000 | Ramsey et al. ............. 119/651 |
| 6,321,688 | B1 | * | 11/2001 | Eriksson ..................... 119/651 |

* cited by examiner

Primary Examiner—Yvonne Abbott
(74) Attorney, Agent, or Firm—Ray R. Regan (57) ABSTRACT

An apparatus and method for variably discharging one or more ingredients other than water on an animal. A nozzle operatively connected to a valve discharges the ingredients. The animal is detected by a either an ultrasonic sensor, a diffused deflective infrared sensor, or single sensing probe sensor. A variety of structural members selectively position the apparatus in relation to the animal. A programmable controller varies the discharge of ingredients on the animal from a continuous application to a variety of interrupted sequences. A timer assembly schedules applications of ingredients on a daily, weekly, or even monthly basis.

29 Claims, 6 Drawing Sheets

APPARATUS FOR VARIABLY DISCHARGING INGREDIENTS ON AN ANIMAL

CROSS-REFERENCE TO RELATED APPLICATION

As provided in 35 U.S.C. §120, applicant claim priority to this nonprovisional continuation-in-part patent application Ser. No. 09/342,046, filed on Jun. 23, 1999, based on the co-pending nonprovisional U.S. patent application, which has matured into U.S. Pat. No. 6,230,660 B1, issued May 15, 2001 ("Greeson Patent").

FIELD OF THE INVENTION

The present invention pertains generally to an apparatus and method for variably discharging ingredients on an animal. More particularly, the present invention pertains to a substantially fully automated apparatus for controlling insects on an animal for effective insect management. The present invention is particularly, but not exclusively, useful for variably discharging chemicals and oils on cows in a dairy herd.

BACKGROUND OF THE INVENTION

Control and management of insects has proven challenging, costly, illusive, and frequently ineffective. The terms "insect" and "insects" as used in this document include (i) not only the conventional class of arthropods and related classes and orders known as muscoid and nonmuscoid flies, but also (ii) arachnids, a class of mainly terrestrial arthropods comprising spiders, scorpions, mites, ticks, and the like, (iii) ectoparasites, parasites living on the surface of an animal, and (iv) endoparasites, parasites living within an animal. Muscoid and nonmuscoid flies, for example, in a wide variety of species, cluster synanthropically to humans and their domestic animals, or in close proximity to humans and domesticated animals such as cows. Insects may have dramatic impact on the economics of animal production, which is a commercial industry constituting a significant contribution to the gross national product of the United States, where the dairy cattle industry has been estimated to produce $12 billion annually. The several different species and class of flies, for example, commonly found on livestock premises may cause a number of problems, including irritating cows so severely that milk production suffers; transmitting disease pathogens; increasing enteric (intestinal) diseases among humans associated with cow herds; violating regulatory rules and regulations, and generating a host of similar problems.

A variety of devices, apparatus and methods have been proposed for controlling insects among cattle, including dairy cows. Except for the invention disclosed in the [co-pending and allowed application of the inventor of the present invention, a document incorporated by reference into this document ("Prior Invention")], none has proven effective in achieving the level of control demanded by industry operators, or providing substantially complete control of a fly population using a substantially automated insect control apparatus requiring minimal operator involvement during operation of the apparatus. In addition, none of the solutions available provides an apparatus or method for varying the rate and amount of discharge of ingredients used to combat insects, particularly the rate and amount of chemical discharge, to reduce costs while maintaining insect control on and around animals.

One known proposal for controlling flies attracted to cattle, for example, is to bury parasites in soil beneath the surface of the soil on which cattle are penned. Other insects, including nematodes, have been introduced into herd locations in hopes of fly control. Fly traps using bait attractants have been used. Those techniques has proven ineffective in controlling fly populations attracted to cattle pens. Parasites achieve control of only a small portion of a fly population, and then only temporarily. Parasites reproduce more slowly than the rate at which flies reproduce, and their hatch rates are unreliable and unpredictable. An effective parasite population also my be reduced because parasites die or fly way. Use of parasites as a method for attempting to control flies among cattle is labor intensive, therefore expensive, usually making the solution unacceptable to an operator of a cattle business. Virtually no control is achieved using nematodes. Nematodes are not suitable for use in acidic soils. Because of the large amounts of manure and urine produced by multiples pens of cattle, all soil used for cattle becomes acidic. In addition, use of nematodes is impractical because nematodes must be applied or introduced into a herd at night, only after rainfall, and reintroduced frequently to achieve any measure of success in controlling insects on an animal and animal herd.

No marked reduction of a insect population occurs with use of fly traps. Fly traps, for example, rely on bait. No bait, however, has proven effective for flies, particularly on large tracts of land used to pen large cattle herds.

Spraying or fogging chemicals on cattle has proven marginal in achieving control of flies for long periods of time. Fogging causes droplet drift, so fogging is not cost effective. For similar reasons, aerial spraying has proven no more effective than use of fly parasites, nematodes, and fly traps using bait attractants.

Other proposals for controlling insects among cattle include feeding cows oral larvicide and applying residual insecticides on the underside of shaders. No significant long-term reduction in the fly population has been observed using an oral larvicide, primarily because no chemical that might work effectively against flies may be fed orally to milking cattle. Even more primitive devices have been used, such as back rubbers, both manuals and automated. A manual back rubber applicator requires an operator to periodically remove, dip into a chemical, and reinstall a rubber device above the back of a cow that walks beneath the rubber device. No noticeable difference, however, in fly population has been observed using this method, and automated variations have proven no more effective. Ear tags, or other apparatus attachable to parts of an animal's body, containing a liquid chemical or insecticide dispensable on an animal, also have not satisfied the industry requirements for an apparatus that provides substantially complete control of the fly population in the form of a substantially automated system requiring relatively little attention during operation. Ear tags or similar apparatus connectable to parts of an animal body cannot be designed to release or apply sufficient chemicals either to an animal or to flies.

Attempting to control insects by spraying underneath shaders, direct spraying of roosting flies, and spraying vegetation near cattle pens, also are ineffective. Those techniques may eliminate problems associated with food and water contamination, but are labor intensive and expensive. An average dairy herd, for example, requires six to seven hours to complete one such spraying cycle, a cycle that must be repeated often to achieve even minimal control. A problem encountered by these methods is the tendency of flies to change roosting areas regularly, requiring an operator to hunt fly roosting areas to effectively induce a spray.

Larvicide spraying has not proven feasible because of the huge volume of water required to penetrate at least three inches below the surface of soil where fly larvae feed. The typical service truck carries only 500 gallons of water, and for a cattle herd held in a common arrangement of twelve pens, the cost of frequent larvicide applications is prohibitive.

An oil based chemical mixture, although expensive, has proven to be the only effective combination of ingredients to control insects among cattle, particularly in a dairy environment. A useful apparatus and method for cost-effective discharge of such ingredients is shown in the Greeson Patent. The Prior Invention provides for water encapsulation to encapsulate water with one or more ingredients to be applied to an animal, including one or more chemicals. It would be useful, however, to provide an apparatus and method that did not use water encapsulation, thus reducing costs and structural challenges of having to provide water to the apparatus. It also would be useful to provide an apparatus capable of further reducing the cost of insect control on animals by reducing the discharge of the chemical component of ingredients applied to an animal, the chemical component being the most expensive ingredient.

A problem to be solved, therefore, is to substantially reduce insect infestation in and around animal herds, including herds of dairy cattle. A related problem is to eliminate the requirement for using water in connection with an apparatus and method for controlling insects on an animal. An additional problem to be solved is to provide an apparatus and method for variably discharging ingredients, including chemicals and oils, in programmable differing rates and amounts, either continuously, or in one or more interrupted sequences.

SUMMARY OF THE INVENTION

Given the conventional solutions for solving the problem of discharging one or more ingredients on an animal, particularly for controlling insects on and around animals, it would be desirable, and of considerable advantage, to provide an apparatus for variably discharging one or more ingredients on an animal.

The present invention provides numerous advantages over present technology. At least one advantage of the present invention is the capability for variably discharging ingredients on an animal. The term "variably discharging," and equivalent forms used in this document, include delivery and discharge of ingredients through a controller in differing rates and amounts, either continuously, or in one or more interrupted sequences. This feature of the present invention significantly reduces waste of expensive chemicals, and consequently the cost of insect control, while achieving substantially full control of insects. Environmental hazards are substantially reduced. The apparatus of the present invention is so efficient that little chemical is wasted, thus affording the user a significant chemical cost reduction.

Still another advantage is elimination of costs and structural complexity associated with providing water for encapsulation of the ingredients. Water encapsulation is highly effective, but adds to the overall costs of the apparatus and operation of the apparatus.

A substantially fully automated apparatus is provided, an important advantage in an industry such as the dairy cattle industry, allowing frequent, regular, repetitive, effective and thorough application of the best and most appropriate combination of ingredients, including chemical mixtures, while substantially eliminating user involvement during operation of the apparatus. Automation is enhanced using a timer assembly for scheduling dates and times of discharge on a daily, weekly, and even monthly basis.

Another advantage of the present invention is the use of a variety of sensors, including, but not limited to, diffused deflective infrared sensors, which also may be used with a plurality of pulse/speed indicators, to cooperate in discharging ingredients based on the rate of movement of the animal, thus also reducing waste of chemicals and cost to a user.

Yet another advantage of the present invention is an automated insect control apparatus, and a method for operating an automated insect control apparatus, that respectively are easy to use and to practice, and which are cost effective for their intended purposes.

These and other advantages are achieved in the present invention by providing an apparatus and method for variably discharging one or more ingredients on an animal. The ingredients include at least one or more chemicals, and one or more oils, but do not include water. The ingredients may also include an oil. The ingredients are dischargeable through one or more nozzle. Nozzle flow is regulated through use of a valve. As indicated, the animal is detected by any of a variety of sensors, including ultrasonic sensors, and alternatively including diffused deflective infrared sensors, and sensors that make a single sensing probe.

The present invention also includes a variety of structural members for selectively positioning the apparatus in relation to the animal. One such member includes a multi-positionable frame. Another such member includes a number of dividing bars that can be arranged to separate one animal from another, and on which nozzles may be located for discharge of ingredients at varying angles of incidence against the animal. Another such element is a swivel nozzle A programmable controller is provided for varying the discharge of ingredients on the animal. The controller includes at least one relay and a programmable interval relay repeat cycle timer for enabling variable discharge of the ingredients.

The apparatus for variably discharging ingredients on an animal also includes a timer assembly. The timer assembly is operatively engageable with a nozzle, or a number of nozzles. The timer assembly is useful for scheduling discharge of the ingredients on a daily, weekly, or even monthly basis. A user may enter scheduling information in the timer assembly and, so long as the user replenishes the ingredients, the apparatus will discharge the ingredients at the time, and on the day, the user selects. The timer assembly is energized by direct current. In addition, the timer assembly includes a clock element for uninterruptedly dispensing ingredients on programmed days and times selected by the user of the apparatus.

Alternatively, the apparatus may also include a system connected to the apparatus for discharging the one or more ingredients according to the rate of movement of the animal. The system includes a plurality of pulse/speed indicators. It is clear, therefore, from the foregoing that the claimed subject matter as a whole, including the structure of the apparatus, and the cooperation of the elements of the apparatus, as well as the method for applying the ingredients on an animal, combine to result in a number of unexpected advantages and utilities of the present invention. The advantages and other objects and features of the present invention will become apparent to those skilled in the art when read in conjunction with the accompanying following description, drawing figures, and appended claims.

The foregoing has outlined broadly the more important features of the invention to better understand the detailed description which follows, and to better understand the contribution of the present invention to the art. Before explaining at least one embodiment of the invention in detail, it is to be understood that the invention is limited in application neither to the details of construction, nor to the arrangements of the components provided in the following description and drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Briefly, the present invention provides an apparatus and method for discharging one or more ingredients on an animal, particularly for control of insects on and around the animal. The ingredients include at least a chemical and an oil, but do not include water. Ingredients are dischargeable through a nozzle. Nozzle flow is regulated through use of a valve. The animal's position, location, movement, and relation to the apparatus is detected by a sensor. A programmable controller is provided for varying the discharge on the animal. A timer assembly is provided for scheduling discharge of ingredients on a daily, weekly, or even monthly basis. A variety of structural members for selectively positioning the apparatus in relation to the animal are included.

Figure 1:
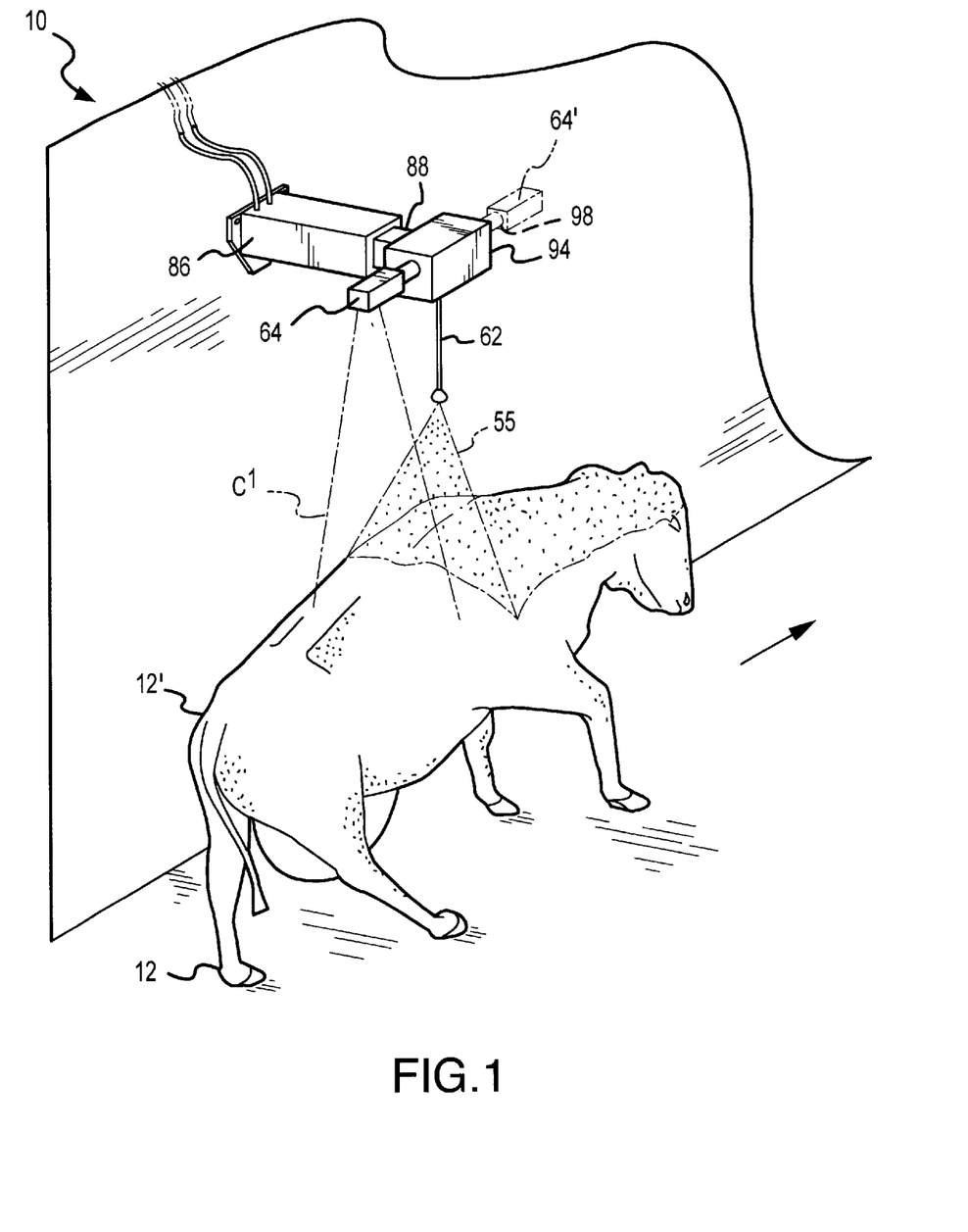
FIG. 1 is a perspective view of an apparatus for controlling insects on an animal, in an operative environment.
Figure 2:
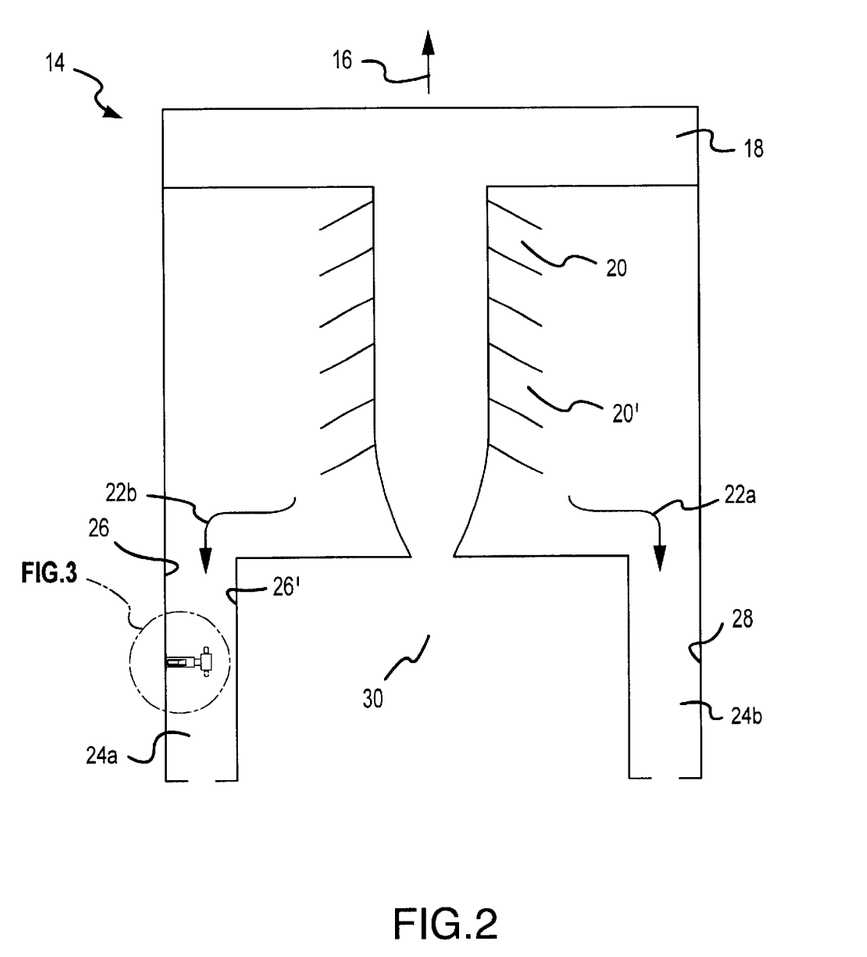
FIG. 2 is a top plan view of a representative floor plan of a dairy pen with an apparatus for controlling insects on an animal located on a wall of the pen.
Figure 3:
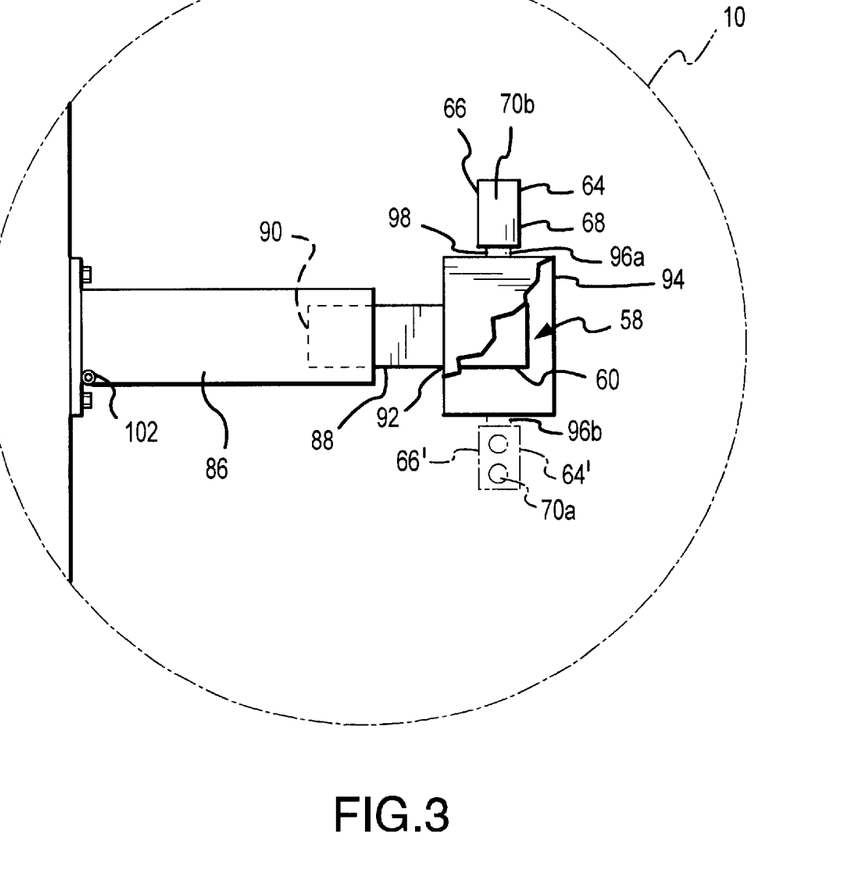
FIG. 3 is a top plan view of an apparatus for controlling insects on an animal as shown in FIG. 2.

Referring to FIG. 1, an apparatus for controlling insects on an animal 10, according to the present invention, is generally shown in an operative environment. An animal 12 is shown in FIG. 1 moving past and beneath the apparatus for controlling insects on an animal 10, in this case a cow 12'. FIG. 2 shows a representative, conventional, but not standard, floor plan of a dairy herd enclosure 14, and thus shows an additional top plan view of an operative environment for an apparatus for controlling insects on an animal 10. FIG. 2 thus includes a first arrow 16 indicating the direction toward outdoor pens (not shown) that may be adjacent enclosure 14 for one or more cows 12'. Also shown in FIG. 2 is a parlor area 18, an area where one or more cows 12' may be temporarily housed or held. As further shown in FIG. 2, representative enclosure 14 includes one or more milking stalls 20. After cow 12' is milked in a milking stall 20', cow 12' is directed out of enclosure 14 in the direction shown by curved arrows 22a,b through an exit alley 24a,b. As shown by cross-reference between FIGS. 1 and 2, an apparatus for controlling insects on an animal 10 is shown, in part, mounted on a first wall 26 inside enclosure 14 to enable cow 12' to pass beneath apparatus for controlling insects on an animal 10. As further shown in FIG. 2, apparatus for controlling insects on an animal 10 also is shown in FIG. 3. As will be apparent to one skilled in the art, apparatus for controlling insects on an animal 10 also may be mounted on the second inside wall 28 of enclosure 14, and one or more cows 12' could be directed through exit alley 24b. As also shown in FIG. 2, enclosure 14 may include a pre-milking pen 30 as a holding area for one or more cows 12'.

Figure 4:
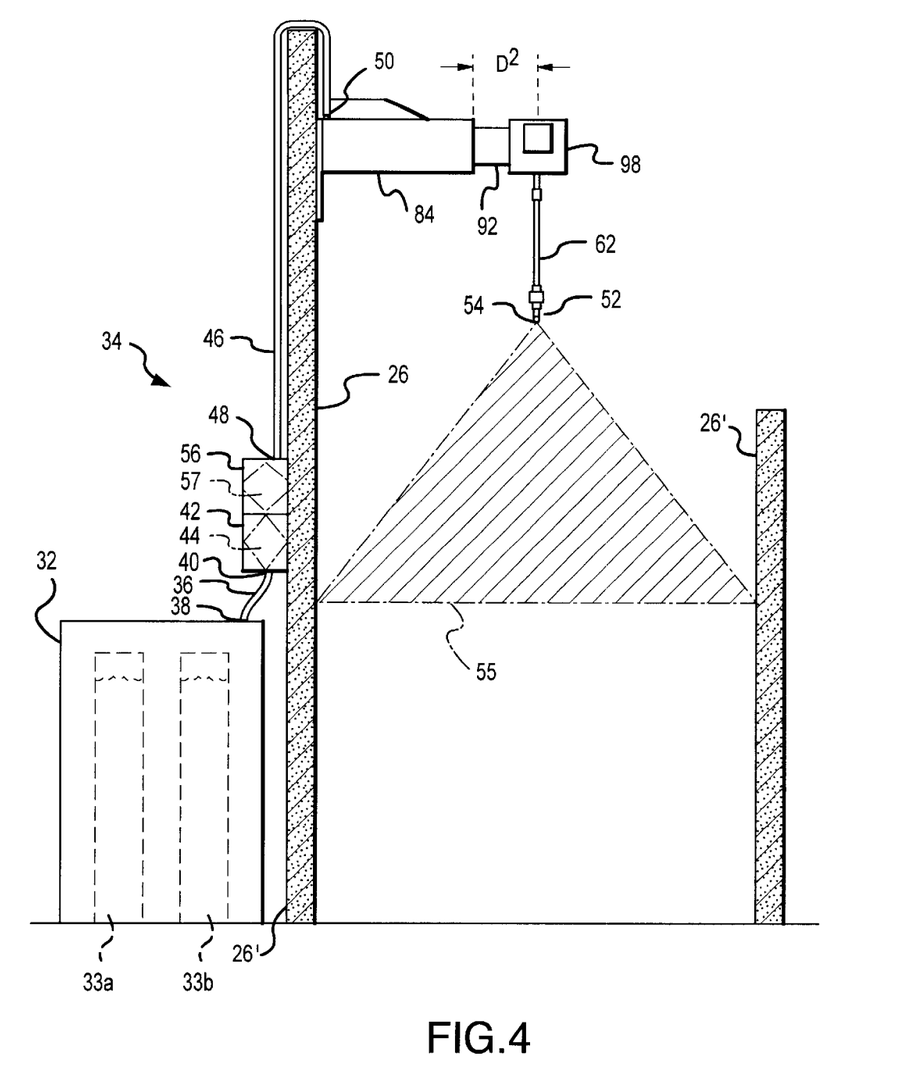
FIG. 4 is a front view of an apparatus for controlling insects on an animal showing a cross-sectional view of a wall on which an apparatus for controlling insects on an animal is mounted.

As shown by reference to FIG. 4, an apparatus for controlling insects on an animal 10 includes a reservoir 32. Reservoir 32 is provided for holding one or more ingredients 33a,b shown diagrammatically in FIG. 4. An apparatus for controlling insects on an animal 10 also includes a delivery system 34 shown generally by cross-reference among FIGS. 1, 3, and 4. Delivery system 34 is in fluid communication with reservoir 32 to enable delivery system 34 to discharge the one or more ingredients in reservoir 32 on animal 12, including cow 12'. The one or more ingredients dischargeable by delivery system 34 includes one or more chemicals 33a containable in reservoir 32. The one or more ingredients dischargeable by delivery system 34 also includes one or more oils 32b. As best shown by cross-reference between FIGS. 1 and 4, in a preferred embodiment of the present invention, the components placing the one or more ingredients 33a,b in reservoir 32 in fluid communication with delivery system 34 include at least one short hose 36 having a lower 38 end and an upper end 40. Lower end 38 of short hose 36 is insertable into reservoir 32. Upper end 40 of short hose 36 is connectable to a first case 42. In a preferred embodiment of the present invention, as shown by reference to FIG. 4, first case 42 may be mounted on wall 26 outside of enclosure 14. First case 42 is provided for housing a pump 44 shown diagrammatically in FIG. 4. In a preferred embodiment of an apparatus for controlling insects on an animal 10, pump 44 housed in first case 42 is an air operated pump.

As also shown in FIG. 4, in a preferred embodiment of delivery system 34 of the present invention, components placing the one or more ingredients in reservoir 32 in fluid communication with delivery system 34 includes at least one long hose 46 having a bottom end 48 and a top end 50. Bottom end 48 of long hose 46 is operatively connectable to pump 44 located in first case 42. Top end 50 of long hose 46 is connectable to an adjustable bracket (more fully described below) of delivery system 34.

In addition, the present invention includes a dispenser 52 as shown in FIG. 4. In a preferred embodiment, the dispenser is a nozzle 54. Using one nozzle 54, full coverage of animal 12, including cow 12', of ingredients 33a,b contained in reservoir 32 is achieved as shown in FIG. 4 by cone 55, representing discharge of one or more ingredients 33a, b from nozzle 54 on cow 12' shown in FIG. 1.

As shown perhaps best in FIG. 4, also included in the present invention is second case 56. Second case 56 houses a timer assembly 57 as shown diagrammatically in FIG. 4. Timer assembly 57 may be used for scheduling discharge of the one or more ingredients on animal 12. Timer assembly 57 is electrically connected to reservoir 14 and delivery system 34, and may be energized by 24 volt direct current. Timer assembly 57 supplies electrical power to nozzle 54. Timer assembly 57 is programmable to be set for the hour, day, week and month to apply or discharge ingredients 33a, b, thus making the apparatus and method of the present invention substantially automatic, and insuring that applications of insecticide to animal 12 will be performed regularly and systematically.

The only user requirement is to periodically replenish ingredients 33a, b.

Figure 5:
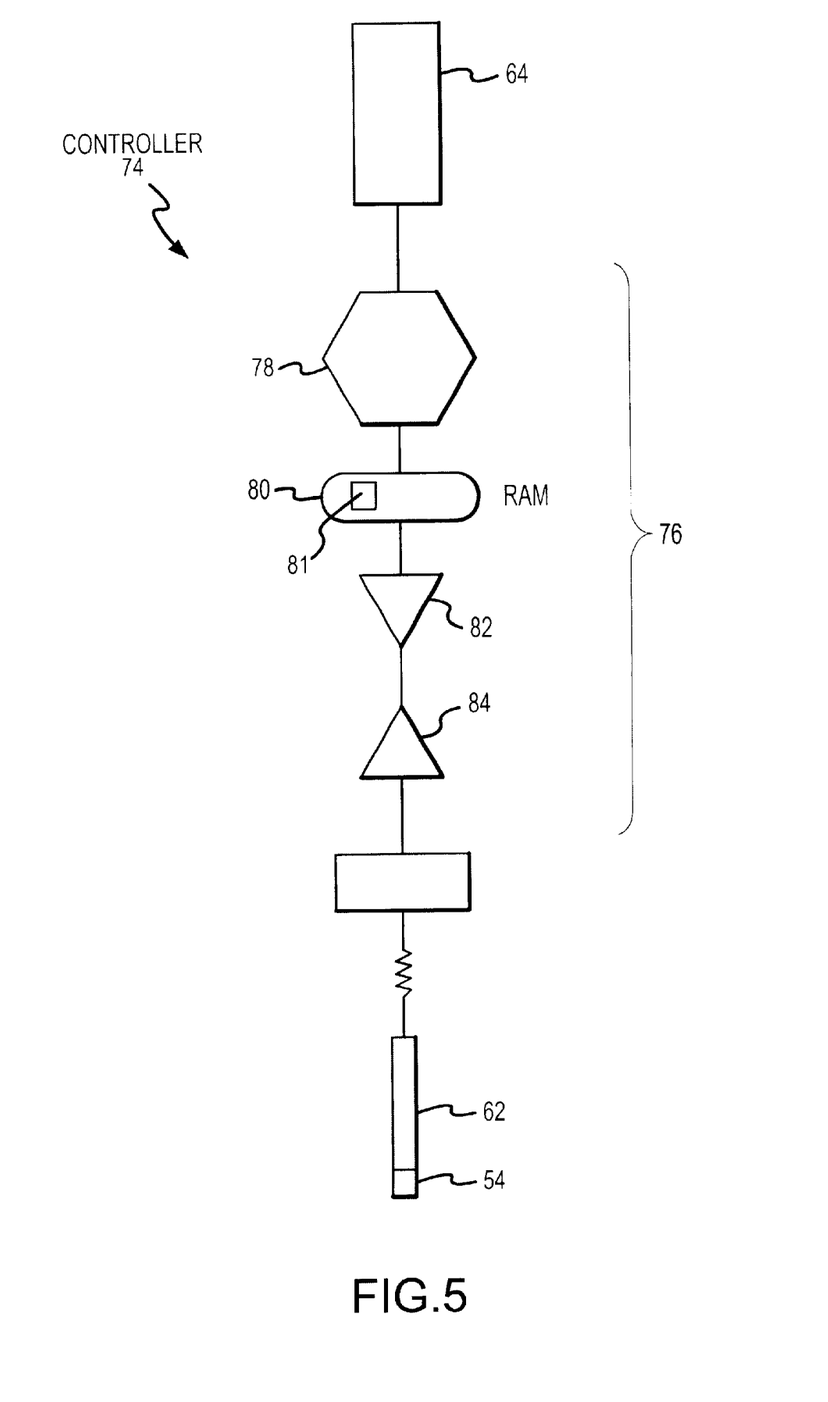
FIG. 5 is a schematic view of elements comprising the controller.

As best shown by cross-reference between FIGS. 3 and 5, the present invention also includes a valve 58. Valve 58 controls flow and pressure of ingredients 33a, b to be discharged by delivery system 34 on animal 12. A variety of valves may be used in the present invention. In the preferred embodiment of the present invention, valve 58 is a control valve known as a solenoid valve 60. Delivery system 34 of a preferred embodiment of the present invention also includes a drop hose 62 as shown by cross-reference between FIGS. 1 and 4. In combination with solenoid valve 60, drop hose 62 maintains substantially constant pressure on ingredients 33a, b in delivery system 34, particularly between solenoid valve 60 and drop hose 62 connected to nozzle 54.

As shown by cross-reference between FIGS. 1, 3, 4 and 5, an apparatus for controlling insects on an animal 10 also includes a sensor 64 for detecting animal 12. Recent innovation in the technology of sensors afford a variety of useful sensing devices useable with the present invention. Traditional sensors are opposed through-beam devices, requiring separate emitters and receivers; that no longer is a limitation. Retroflective sensors have both an emitter and receiver in the same housing; a light beam may be established between the sensor and a special retroflective target, including the darker body of a cow 12'. Diffuse, or proximity mode sensors, also contain both an emitter and receiver in the same housing, but the target, again including the surface of a target like a cow 12', reflects back to the receiver adequate light to be processed by special lenses in a broad, diffused pattern. Diffuse reflective infrared sensors, however, use lenses to collimate, or make parallel, emitted light and received light. For such sensors, beam patterns may be plotted and calculated to determine responses to a beam based on a target. Convergent beam sensors, like diffuse sensors, use additional optics to produce a small but well-defined sensing area. Ultrasonic sensors used ultrasound for opposed mode or reflective proximity mode detection. Ultrasonic sensors may measure time delays between emitted sound and a returned echo, and can achieve high correlation between output and sensing distance. Most sensors are used for presence sensing, and offer a relay as an output switching device that usually is open or closed ("on" or "off"). Ultrasonic sensors, as a class or mode, also are categorized by transducer type, either electrostatic or piezoelectric. Sensor repeatability is determinable for all sensors. Modulation schemes count or determine a defined number of received light pulses before responding to a light signal before a sensor is allowed to switch. The "on" response time is equal to the total amount of time taken for the sensor to count, or demodulate, the required number of pulses. Because the sensing event, however, can occur at any time during a modulation cycle, or period, actual time between the sensing event and the sensor's output change can vary; the variation is the sensor's repeatability. As indicated, because of advancements in the technology of sensors, a variety of sensors may be used in the practice of the present invention.

In a preferred embodiment of the present invention, sensor 64 is an ultrasonic sensor 66. In an alternative embodiment of the present invention, an diffused deflective infrared sensor 68 may be used. Diffused deflective infrared sensor 68 operates substantially similar to ultrasonic sensor 66, but emitting an infrared beam of light at a target, and receiving the light beam response or reflection from the target based on triangulations. Accordingly, diffused deflective infrared sensor 68 need not be placed to the side of the target, such as animal 12, but may be positioned above the animal.

Ultrasonic sensor 66, and diffused deflective infrared sensor 68, may also be used in conjunction with a plurality of pulse-speed indicators 70a, b as shown in FIG. 3. Pulse speed indicators 70 measure the speed of movement of animal 12 between pulse-speed indicator 70a and pulse-speed indicator 70b, sending a signal to adjust the amount of chemical 33a and oil 33b to be discharged on animal 12. The velocity of movement of animal 12 across the path of pulse-speed indicator 70a begins a timing sequence for animal 12 beginning on detection. Timing ends when pulse-speed indicator associated with pulse-speed indicator 70b. A programmable logic chip or similar device (not shown) for determining the amount of ingredients 33a,b to discharge on each passing animal 12 is activated. Pulse speed indicators 70a,b would be particularly useful as a cost-effective containment on the amount of expensive chemical 33a to apply to a particular animal 12 passing apparatus 10.

In a preferred embodiment of the present invention, apparatus 10 includes means operatively connectable to sensor 64 for variably discharging one or more ingredients 33 on animal 12. As shown in FIG. 5, the preferred means for the present invention is a controller 74. Controller 74 is programmable and is operatively connected to valve 58 and to sensor 64. The capability of the present invention to discharge ingredients 33a,b either continuously on in one or more interrupted sequences of applications using controller 74 is of considerable advantage over known apparatus and methods for discharging insecticides on an animal 12. At least one significant advantage is reduction of costs, particularly chemical costs. As explained in this document, chemicals used to control insects on and around cows 12' are very costly. Because coverage on an animal 12 remains effective, as provided by the present invention, any reduction in chemical costs is a significant advantage over current apparatus and methods.

As shown in FIG. 5, controller 74 includes one or more relays and timers for repeating on delay off-delay functions that may continuously turn valve 58 on and off while receiving a signal from timer assembly 57. A programmable logic card 76, shown schematically in FIG. 5, is located in, or is operatively connectable to, sensor 64. As indicated in this document, 24 volt direct current may be supplied to sensor 64, which in the preferred embodiment of the present invention, is ultrasonic sensor 66. Sensor 64 emits a sound wave when an object such as animal 12 comes within a desired distance of sensor 64, preferably 60 inches from sensor 66. A relay, preferably a first solid-state relay 78, is located on removable card 76, capable of processing a signal between 21 to 25 milliamps. A signal is transmitted to a random access memory storage (RAM) 80 on logic card 76. Random access memory storage 80 has a preset program or one or more chips 80' associated with random access memory storage 80. The preset program or one or more chips 80' controls interval relay 82, which controls the length of total discharge time if animal 12 remains in the sensing window of sensor 64. Interval relay 82 controls usage of chemical 33a and oil 33b by determining the length of time controller 74 will be operative. If animal 12 ceases forward progression past apparatus 10, interval relay 82 turns off apparatus 10 until animal 12 clears the sensing area of sensor 64. A repeat cycle timer 82 also may included in controller 74. When animal 12 clears the area, interval relay 82 sends power to the pulse output relay 84, which begins to cycle on and off as programmed.

Unexpected and significant results occur by using controller 74 with apparatus 10. Extensive nozzle testing using a 350 or greater viscosity liquid, or combination of liquids as potential ingredients 33a and 33b, in an effort to reduce chemical usage, and thus make apparatus 10 more economical for dairies, indicates that use of certain nozzles requires more pressure to achieve acceptable spraying patterns in liquids of such viscosity. At some pressures, small droplets drift off a target such as animal 12. Droplets in the 30 to 60 micron range dispersed at a rate of 0.75 to 1.00 feet per second, indicating potential health risks to animal 12 and to users of apparatus 10. An acceptable fall rate is 2.00 to 3.00 feet per second. To reduce chemical output of apparatus 10, the most costly ingredient, the use of smaller nozzles may make water encapsulation difficult in some applications. Controller 74 offers the advantages of decreasing health risks, while also decreasing costs of operation, while maintaining effective coverage.

Figure 6:
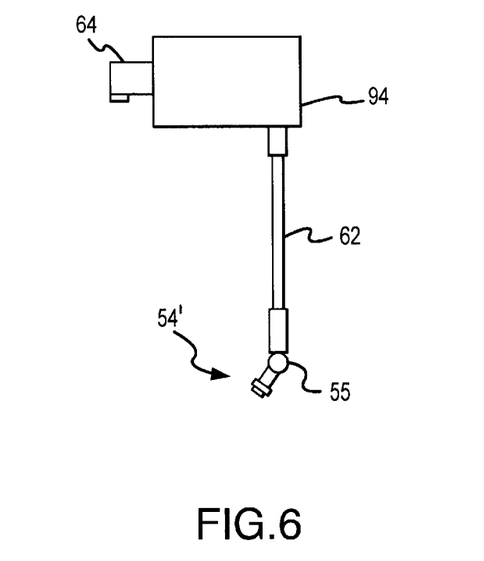
FIG. 6 is a side view of the swivel nozzle of the present invention.
Figure 7:
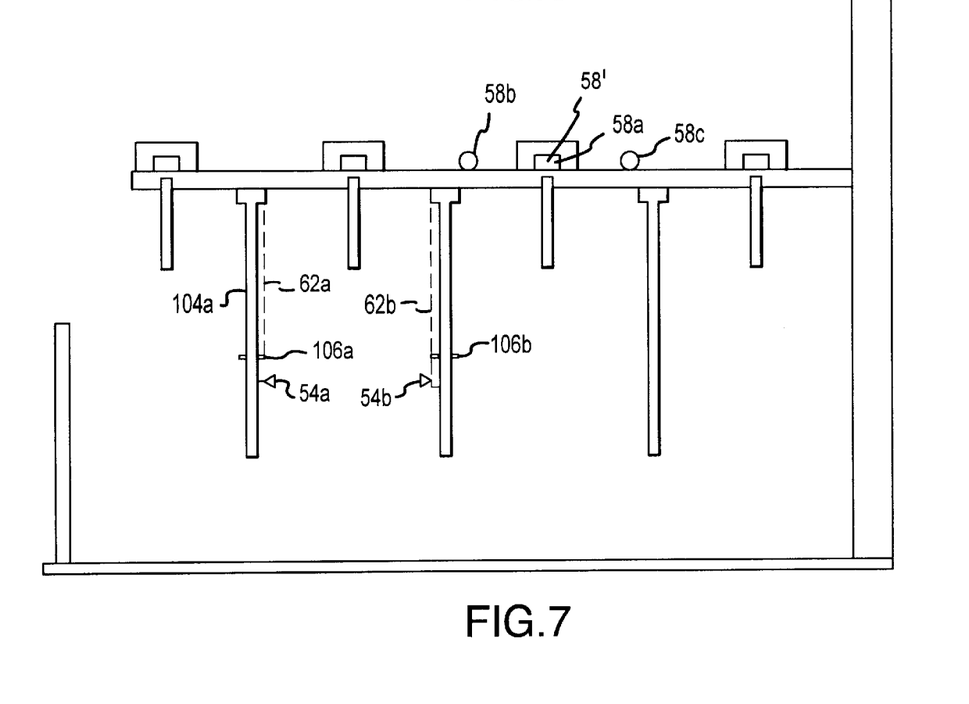
FIG. 7 is front view showing a plurality of divider bars, and an alternative deployment of a three-way valve, or three one-way valves in accordance with the present invention.

As shown by cross-reference among FIGS. 1 and 3, the present invention also includes one or more members demountably coupled to apparatus 10 for selectively positioning apparatus 10 in relation to animal 12. Such members include a bracket 86. Bracket 86 includes a boom 88 formed with a first end 90 and a second end 92. Second end 92 of boom 88 is attachable to a housing pod 94. Bracket 86 includes an arm 96. Arm 96a shows a preferred embodiment of the present invention, and arm 96b shows an alternative, among many, of where arm 96 may be located. Sensor 64 is mountable on proximal end 98 of arm 96. As will be apparent to one skilled in the art, arm 96 may be located at any of a variety of locations on housing pod 94. In at least one alternative embodiment of the present invention, a swivel nozzle 54' is provided, as shown in FIG. 6. Swivel nozzle 54' includes a ball joint 55 in fluid communication between drop hose 62 and nozzle 54, making swivel nozzle 54' multi-positionable. In yet another embodiment of apparatus 10, as shown in FIG. 3, bracket 86 includes a hinge 102 for moving apparatus 10 away from a working area when not used. In a further embodiment of apparatus 10, a plurality of divider bars 104 are provided as shown in FIG. 7. Divider bars 104a, b, c, d may be manufactured from any material. In a preferred embodiment of the present invention, plurality of divider bars 104 are made of any plastic, fibre glass, nylon, or resin material, shaped in a tubular rod, and contribute to keeping one or more animals 12 separated while passing a plurality of apparatus 10 installations. As also shown in FIG. 7, one or more nozzles 54a, b on drop hoses 62a, b, which may be secured to divider bars 104 with a clamp 106, to provide discharge from the side of animal 12 rather than from the top. Alternatively, included with the present invention to further control use of chemical 33a in connection with operation of apparatus 10.

The apparatus for variably discharging one or more ingredients on an animal, shown in drawing FIGS. 1 through 7, is but one embodiment of the present invention, is not intended to be exclusive, and is not a limitation of the present invention. While the particular apparatus for variably discharging one or more ingredients on an animal as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. An apparatus for controlling insects on an animal, comprising:

one or more ingredients dischargable on the animal, wherein the one or more ingredients do not include water;

a delivery system for discharging the one or more ingredients on the animal;

means in fluid communication with the one or more ingredients for applying the one or more ingredients on the animal;

a valve connectable to the one or more ingredients applying means;

an ultrasonic sensor positionable on the apparatus for detecting the presence of the animal;

means operatively connectable to the ultrasonic sensor for variably discharging the one or more ingredients; and one or more members demountably coupled to the apparatus for selectively positioning the apparatus in relation to the animal.

2. An apparatus for controlling insects on an animal as recited in claim 1, wherein the one or more ingredients includes at least one chemical.

3. An apparatus for controlling insects on an animal as recited in claim 1, wherein the one or more ingredients includes at least one oil.

4. An apparatus for controlling insects on an animal as recited in claim 1, wherein the applying means includes a nozzle.

5. An apparatus for controlling insects on an animal as recited in claim 1, wherein the variably discharging means is a controller.

6. An apparatus for controlling insects on an animal as recited in claim 5, wherein the controller includes at least one relay.

7. An apparatus for controlling insects on an animal as recited in claim 5, wherein the controller includes a programmable interval relay repeat cycle timer.

8. An apparatus for controlling insects on an animal as recited in claim 1, wherein the one or more members for selectively positioning the apparatus includes at least a multi-positionable frame.

9. An apparatus for controlling the discharge of one or more ingredients on an animal, comprising:

means positionable on the apparatus for detecting the animal;

at least one nozzle in fluid communication with the one or more ingredients;

a device connectable to the at least one nozzle and to the detecting means for regulating passage of the one or more ingredients through the apparatus and the one or more nozzles;

a system operatively connectable to the apparatus for discharging the one or more ingredients according to the rate of movement of the animal; and one or more mechanisms mountable on the apparatus for selectively positioning the apparatus in relation to the animal.

10. An apparatus for controlling the discharge of one or more ingredients on an animal as recited in claim 9, wherein the animal detecting means is a sensor.

11. An apparatus for controlling the discharge of one or more ingredients on an animal as recited in claim 10, wherein the sensor is a diffused deflective infrared sensor.

12. An apparatus for controlling the discharge of one or more ingredients on an animal as recited in claim 11, wherein the diffused deflective infrared sensor is operatively positionable above the animal.

13. An apparatus for controlling the discharge of one or more ingredients on an animal as recited in claim 10, wherein the sensor performs a single sensing probe.

14. An apparatus for controlling the discharge of one or more ingredients on an animal as recited in claim 9, wherein the system includes a plurality of pulse/speed indicators.

15. An apparatus for controlling the discharge of one or more ingredients on an animal as recited in claim 9, wherein the one or more mechanisms is a swivel nozzle.

16. A method for applying one or more ingredients on an animal, comprising:
    providing means for applying the one or more ingredients on the animal;
    positioning a sensor on the one or more ingredients providing means for detecting the animal;
    installing a controller operatively connectable to the sensor for variable application of the one or more ingredients on the animal; and
    including one or more members for selectively positioning the one or more ingredients providing means in relation to the animal.

17. A method for applying one or more ingredients on an animal as recited in claim 16, where in the providing step includes the substeps of:
    providing a one or more ingredients dischargable on the animal, wherein the one or more ingredients do not include water;
    providing a nozzle in fluid communication with the one or more ingredients; and
    providing a valve connectable to the nozzle.

18. A method for applying one or more ingredients on an animal as recited in claim 16, wherein the sensor positioning step includes the substep of using an ultrasonic sensor.

19. A method for applying one or more ingredients on an animal as recited in claim 16, wherein the sensor positioning step includes the substep of using a diffused deflective infrared sensor.

20. A method for applying one or more ingredients on an animal as recited in claim 16, wherein the sensor positioning step includes the substep of using a pulse/speed indicator.

21. A method for applying one or more ingredients on an animal as recited in claim 16, wherein the installing step includes the substep of operatively connecting the controller to a timer assembly.

22. A method for applying one or more ingredients on an animal as recited in claim 16, wherein the including step includes the substeps of:
    including a swivel nozzle;
    including a plurality of dividing bars; and
    including a multi-positionable frame.

23. A method for applying one or more ingredients on an animal, comprising:
    providing means for applying the one or more ingredients on the animal;
    positioning an ultrasonic sensor on the one or more ingredients providing means for detecting the animal;
    installing a controller operatively connectable to the sensor for variable application of the one or more ingredients on the animal; and
    including one or more members for selectively positioning the one or more ingredients providing means in relation to the animal.

24. A method for applying one or more ingredients on an animal as recited in claim 23, wherein the providing step includes the substeps of:
    providing means for applying the one or more ingredients on the animal;
    positioning a sensor on the one or more ingredients providing means;
    installing a controller operatively connectable to the sensor for variable application of the one or more ingredients on the animal; and
    including one or more mechanisms for configuring the apparatus.

25. A method for applying one or more ingredients on an animal as recited in claim 24, wherein the providing step also includes the substeps of:
    providing a one or more ingredients dischargable on the animal, wherein the one or more ingredients do not include water;
    providing a nozzle in fluid communication with the one or more ingredients; and
    providing a valve connectable to the nozzle.

26. A method for applying one or more ingredients on an animal, comprising:
    providing means for applying the one or more ingredients on the animal;
    positioning a sensor on the one or more ingredients providing means,
    wherein the sensor positioning step includes the substep of using a pulse/speed indicator;
    installing a controller operatively connectable to the sensor for variable application of the one or more ingredients on the animal; and
    including one or more mechanisms for configuring the apparatus.

27. A method for applying one or more ingredients on an animal as recited in claim 26, wherein the sensor positioning step includes the substep of using a diffused deflective infrared sensor.

28. A method for applying one or more ingredients on an animal, comprising:
    providing means for applying the one or more ingredients on the animal;
    positioning a sensor on the one or more ingredients providing means;
    installing a controller operatively connectable to the sensor for variable application of the one or more ingredients on the animal; and
    including one or more mechanisms for configuring the apparatus, wherein the including step includes the substeps of:
    including a swivel nozzle;
    including a plurality of dividing bars; and
    including a multi-positionable frame.

29. A method for applying one or more ingredients on an animal as recited in claim 28, wherein the installing step includes the substep of operatively connecting the controller a timer assembly.

* * * * *

UNITED STATES PATENT AND TRADEMARK OFFICE
CERTIFICATE OF CORRECTION

PATENT NO.    : 6,651,589 B2
DATED         : November 25, 2003
INVENTOR(S)   : John S. Greeson It is certified that error appears in the above-identified patent and that said Letters Patent is hereby corrected as shown below:

<u>Column 9,</u>
Line 65, after the word "Alternatively," insert the following words:
-- ... as also shown in Figure 7, a three-way valve 58', or three separate one-way valves 58a,b,c may be.... --

Signed and Sealed this

Twenty-seventh Day of April, 2004

JON W. DUDAS
*Acting Director of the United States Patent and Trademark Office*